United States Patent
Jo (10) Patent No.: US 12,204,947 B2
(45) Date of Patent: Jan. 21, 2025

(54) RESOURCE MANAGEMENT DEVICE, RESOURCE MANAGEMENT METHOD AND PROGRAM

(71) Applicant: Nippon Telegraph and Telephone Corporation, Tokyo (JP)

(72) Inventor: Hiroyuki Jo, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 498 days.

(21) Appl. No.: 17/619,871

(22) PCT Filed: Jun. 19, 2019

(86) PCT No.: PCT/JP2019/024195
§ 371 (c)(1),
(2) Date: Dec. 16, 2021

(87) PCT Pub. No.: WO2020/255277
PCT Pub. Date: Dec. 24, 2020

(65) Prior Publication Data
US 2022/0357996 A1    Nov. 10, 2022

(51) Int. Cl.
*G06F 3/00* (2006.01)
*G06F 9/455* (2018.01)
*G06F 9/50* (2006.01)

(52) U.S. Cl.
CPC ........ *G06F 9/5077* (2013.01); *G06F 9/45558* (2013.01); *G06F 2009/4557* (2013.01)

(58) Field of Classification Search
CPC ...................................................... G06F 9/50
See application file for complete search history.

(56) References Cited

U.S. PATENT DOCUMENTS

| 6,799,208 B1 * | 9/2004 | Sankaranarayan .. H04N 21/443 710/6 |
| 7,111,297 B1 * | 9/2006 | Sankaranarayan ... G06F 9/5038 718/104 |

(Continued)

FOREIGN PATENT DOCUMENTS

JP        2017143452        8/2017

OTHER PUBLICATIONS

Bhed Bahadur Bista, Resource Reservation with Session Time in Multicast Routing. (Year: 2005).*

(Continued)

*Primary Examiner* — Lechi Truong
(74) *Attorney, Agent, or Firm* — Fish & Richardson P.C.

(57) ABSTRACT

A resource management device (100) includes: a virtualized resource reservation unit (114) that receives a reservation request for a virtualized resource, and allocates and reserves the virtualized resource included in the reservation request; and a virtualized resource state management unit (115) that, when reservation performed for the reservation request fails, releases reservations of virtualized resources already reserved (existing reservations), allocates and reserves the virtualized resource included in the reservation request, and performs re-reservation for the existing reservations by allocating virtualized resources to the existing reservations. When the virtualized resource state management unit (115) fails in the re-reservation even for one or some of the existing reservations, reservation information is unchanged in a state stored when the virtualized resource reservation unit (114) fails in the reservation performed for the reservation request.

19 Claims, 6 Drawing Sheets

(56) References Cited

U.S. PATENT DOCUMENTS

| | | | | |
|---|---|---|---|---|
| 8,887,157 | B2* | 11/2014 | Khanna | G06F 11/1484 |
| | | | | 718/1 |
| 9,055,067 | B1* | 6/2015 | Ward, Jr. | H04L 47/72 |
| 10,289,441 | B1* | 5/2019 | Chopra | G06F 11/301 |
| 10,374,970 | B2* | 8/2019 | Patil | H04L 47/783 |
| 10,606,709 | B1* | 3/2020 | Bansal | G06F 11/1464 |
| 11,409,619 | B2* | 8/2022 | Gopalan | G06F 11/1484 |
| 2005/0105490 | A1* | 5/2005 | Lee | H04L 47/746 |
| | | | | 455/436 |
| 2006/0190482 | A1* | 8/2006 | Kishan | G06F 9/5027 |
| 2007/0022425 | A1* | 1/2007 | Jackson | G06F 9/5038 |
| | | | | 718/104 |
| 2007/0255835 | A1* | 11/2007 | Coppinger | G06F 9/505 |
| | | | | 709/229 |
| 2014/0245050 | A1* | 8/2014 | Tsirkin | G06F 9/4881 |
| | | | | 713/324 |
| 2016/0371119 | A1* | 12/2016 | Moroski | G06F 9/5016 |
| 2017/0199791 | A1* | 7/2017 | Mitkar | G06F 9/485 |
| 2020/0133796 | A1* | 4/2020 | Liao | G06F 11/1469 |
| 2020/0183714 | A1* | 6/2020 | Wang | H04L 41/40 |
| 2023/0035929 | A1* | 2/2023 | Ding | G06F 11/1451 |

OTHER PUBLICATIONS

Marco A. S. Netto, Rescheduling Co-Allocation Requests based on Flexible Advance Reservations and Processor Remapping. (Year: 2008).*

[No Author Listed] [online], "Network Functions Virtualisation (NFV) Release 3; Management and Orchestration; Functional Requirements Specification," ETSI GS NFV-IFA 010 V3.2.1(Apr. 2019), dated Apr. 2019, retrieved from URL etsi.org/deliver/etsi_gs/NFV-IFA/001_099/010/03.02.01_60/gs_NFV-IFA010v030201p.pdf>, 101 pages.

* cited by examiner

| RESERVATION ID (131) | PHYSICAL DEVICE ID (132) | RESOURCE TYPE (133) | RESOURCE AMOUNT (134) | |
|---|---|---|---|---|
| RQ4935 | H034 | MEMORY | 512 | |
| RQ4935 | H034 | CPU | 8 | |
| RQ5432 | H028 | CPU | 16 | |
| ... | ... | ... | ... | |

130

| | SPECIFIED PROPERTY (135) | RESERVATION PERIOD (136) | STATE (137) | |
|---|---|---|---|---|
| | NA | 201905181200-201905191200 | RESERVED | ⎫ 148 |
| | NA | 201905181200-201905191200 | RESERVED | ⎬ 149 |
| | GPU | 201905101330-201905101200 | IN USE | |
| | ... | ... | ... | |

Fig. 5

| RESERVATION ID (151) | PHYSICAL DEVICE ID (152) | RESOURCE TYPE (153) | RESOURCE AMOUNT (154) | |
|---|---|---|---|---|
| RQ4935 | H034 | MEMORY | 512 | |
| RQ4935 | H034 | CPU | 8 | |
| ... | ... | ... | ... | |

150

| | SPECIFIED PROPERTY (155) | RESERVATION PERIOD (156) |
|---|---|---|
| | NA | 201905181200-201905191200 |
| | NA | 201905181200-201905191200 |
| | ... | ... |

RESOURCE MANAGEMENT DEVICE, RESOURCE MANAGEMENT METHOD AND PROGRAM

CROSS-REFERENCE TO RELATED APPLICATIONS

This application is a National Stage application under 35 U.S.C. § 371 of International Application No. PCT/JP2019/024195, having an International Filing Date of Jun. 19, 2019, the disclosure of which is considered part of the disclosure of this application, and is incorporated in its entirety into this application.

TECHNICAL FIELD

The present invention relates to a resource management device, a resource management method, and a program in a virtualization infrastructure.

BACKGROUND ART

Network services using virtualization technology-based IaaS (Infrastructure as a Service) and NFV (Network Functions Virtualization) have been widespread. In a virtualization infrastructure for such services, resources such as a CPU (Central Processing Unit), a memory, a network interface, and a network are virtualized, and a resource that is virtualized (virtualized resource) is reserved at a request of a user (network service provider) and used. When reservation is performed, a type, an amount, a spec, and the like of a virtualized resource are specified (Non-Patent Literature 1). In some cases, reservations are assigned priorities, and a reservation assigned a higher priority is more prioritized (Patent Literature 1).

Reservation fails when there is no virtualized resource available for a reservation period. When reservation fails, a user cannot use a virtualization infrastructure and therefore cannot construct a service or a system. To solve such a problem, it is necessary to ask another user to release a reserved resource or a resource in use, or to wait until virtualized resources are augmented, so that efforts and costs are expended.

CITATION LIST

Patent Literature

Patent Literature 1: Japanese Patent Laid-Open No. 2017-143452

Non-Patent Literature

Non-Patent Literature 1: Network Functions Virtualisation (NFV) Release 3; Management and Orchestration; Functional requirements specification, ETSI GS NFV-IFA 010 V3.2.1 (2019 April), [online], ETSI, [retrieved on Jun. 3, 2019], Internet <URL: https://www.etsi.org/deliver/etsi_gs/NFV-IFA/001_099/010/03.02.01_60/gs_NFV-IFA010v030201p.pdf>

SUMMARY OF THE INVENTION

Technical Problem

Success or failure in reservation of a virtualized resource depends on how existing reservations of virtualized resources are allocated to physical resources (physical devices such as a physical host and a network device) at a point of time when the reservation is performed.

Figure 8:
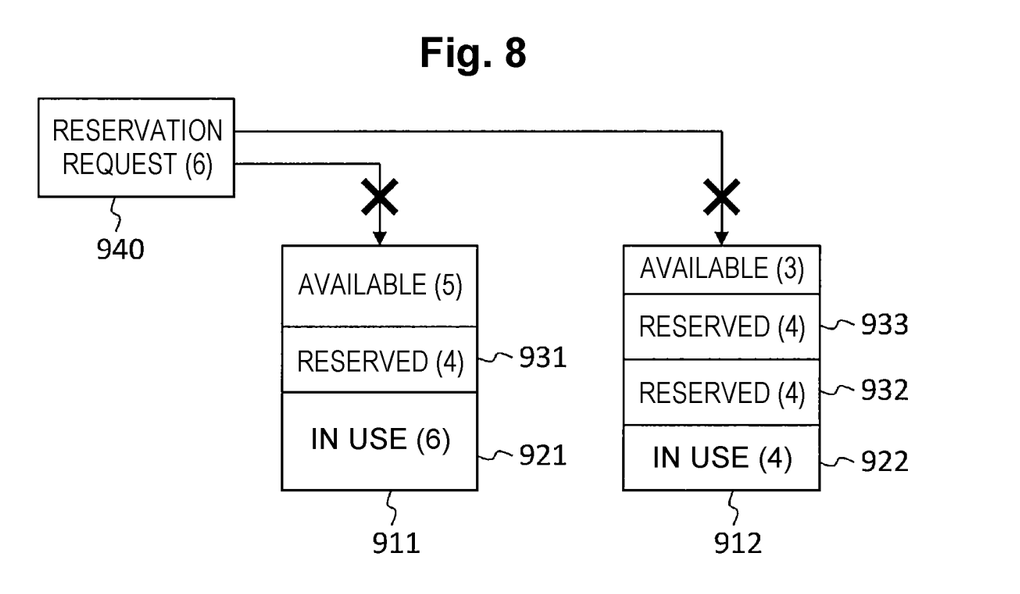
FIG. 8 is a diagram for describing a state of allocation of (reservation information on) existing reservations to physical devices in which a new reservation cannot be arranged.

FIG. 8 is a diagram for describing a state of allocation of (reservation information on) existing reservations to physical devices 911, 912 in which a new reservation cannot be arranged. A reservation request 940 is a request for reservation of a virtualized resource with an amount of 6 for a reservation period T. A state of allocation of virtualized resources in the physical device 911 during the reservation period T is that a virtualized resource with an amount of 6 is allocated for a service 921 (a virtual machine, a virtualized network function) use of which has already been started, a virtualized resource with an amount of 4 is further allocated for a service 931 that is reserved, and a virtualized resource with an amount of 5 remains available. In the physical device 912, a virtualized resource with an amount of 4 is allocated for a service 922 use of which has already been started, virtualized resources each with an amount of 4 are further allocated for services 932, 933 that are reserved, respectively, and a virtualized resource with an amount of 3 remains available. In such a state of allocation of the virtualized resources, a total amount of the available virtualized resources is 8, but an available virtualized resource with an amount of 6 does not exist in the physical devices 911, 912, so that reservation performed for the reservation request 940 fails.

Figure 9:
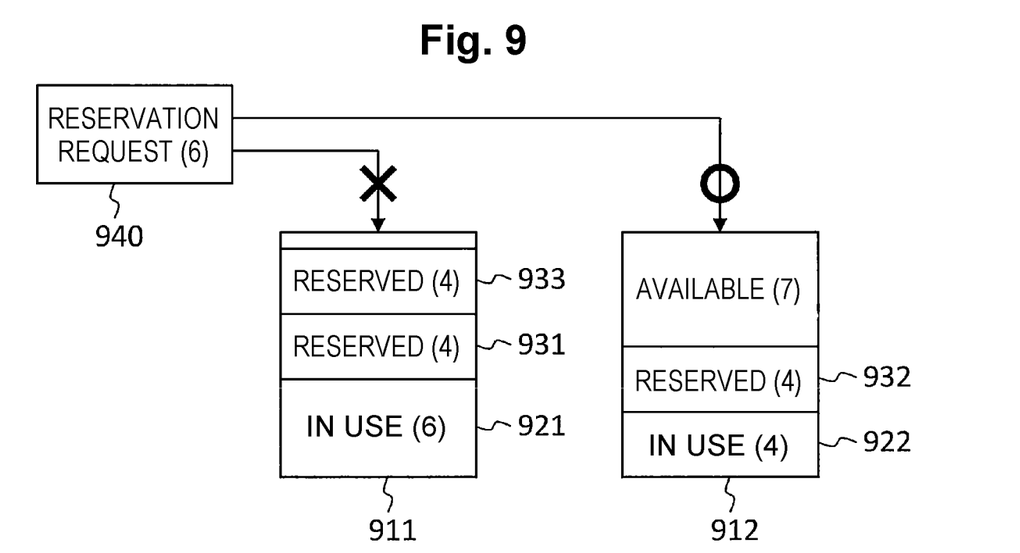
FIG. 9 is a diagram for describing a state of allocation of the existing reservations to the physical devices in which a new reservation can be arranged.

FIG. 9 is a diagram for describing a state of allocation of the existing reservations to the physical devices 911, 912 in which a new reservation can be arranged. A state of allocation of virtualized resources in the physical device 911 during the reservation period T is that a virtualized resource with an amount of 6 is allocated for the service 921 use of which has already been started, virtualized resources each with an amount of 4 are further allocated for the services 931, 933 that are reserved, respectively, and a virtualized resource with an amount of 1 remains available. In the physical device 912, a virtualized resource with an amount of 4 is allocated for the service 922 use of which has already been started, a virtualized resource with an amount of 4 is further allocated for the service 932 that is reserved, and a virtualized resource with an amount of 7 remains available. In such a state of allocation of the virtualized resources, the virtualized resource requested by the reservation request 940 can be secured in the physical device 912, so that reservation succeeds.

Even when the same services 921, 922, 931 to 933 are allocated to the same physical devices 911, 912, success and failure of reservation performed for the reservation request 940 may differ depending on how the services are allocated to the physical devices 911, 912.

In FIGS. 8 and 9, a description has been given of success and failure of reservation that depend on differences in state of allocation of reservations to physical devices, with attention focused on an amount of each virtualized resource (the number of virtual CPUs, memory size, network bandwidth, and the like). In other cases, reservation may fail due to a property (spec) of a physical device. For example, it is assumed that the physical device 911 is equipped with special hardware such as a GPU (Graphics Processing Unit), and the physical device 912 is not. A reservation request requesting reservation of a virtualized resource including a GPU fails when the reservation request is made for a reservation period during which a service that does not use a GPU is allocated to the physical device 911, which is therefore unavailable. If the service that does not use a GPU is allocated to the physical device 912, the reservation request has a chance of resulting in success.

The present invention has been made in view of such a background, and an object of the present invention is to provide a resource management device, a resource management method, and a program that make it possible to enhance a usage rate of resources in a virtualization infrastructure.

Means for Solving the Problem

To solve the problem, a resource management device includes: a storage unit including a virtualized resource management database that stores reservation information on a virtualized resource by storing the virtualized resource and a reservation period of the virtualized resource in association with each other; a virtualized resource reservation unit that receives a reservation request for the virtualized resource, and allocates and reserves the virtualized resource included in the reservation request; and a virtualized resource state management unit that, when reservation performed for the reservation request fails, performs tentative release of a reservation with respect to one or more existing reservations each representing a reservation of a virtualized resource already reserved, allocates and reserves the virtualized resource included in the reservation request, performs re-reservation for each of the one or more existing reservations by allocating an applicable virtualized resource, and when the re-reservation succeeds for all of the one or more existing reservations, concludes that the reservation request succeeds, and when the re-reservation fails even for one or some of the one or more existing reservations, releases a reservation arranged for the reservation request and keeps reservation information on the one or more existing reservations stored before the tentative release is performed.

Effects of the Invention

According to the present invention, a resource management device, a resource management method, and a program can be provided that make it possible to enhance a usage rate of resources in a virtualization infrastructure.

DESCRIPTION OF EMBODIMENTS

Configuration of Virtualization Infrastructure

Hereinafter, a resource management device in an embodiment of the present invention will be described. When a reservation request (a request for allocation of a virtualized resource) fails, the resource management device releases (tentatively releases) allocation of an existing reservation to a virtualized resource (a reservation that is already allocated a virtualized resource, excluding a reservation allocated a virtualized resource in use), allocates a virtualized resource for the reservation request, and subsequently reallocates the existing reservation to a virtualized resource. When the reallocation succeeds, the reservation request succeeds. When the reallocation fails, the resource management device brings allocation of the existing reservation back to the allocation before released, and concludes that the reservation request fails. When a new reservation request succeeds during the reallocation, the resource management device performs reallocation of existing reservations including the new reservation request to virtualized resources.

Figure 1:
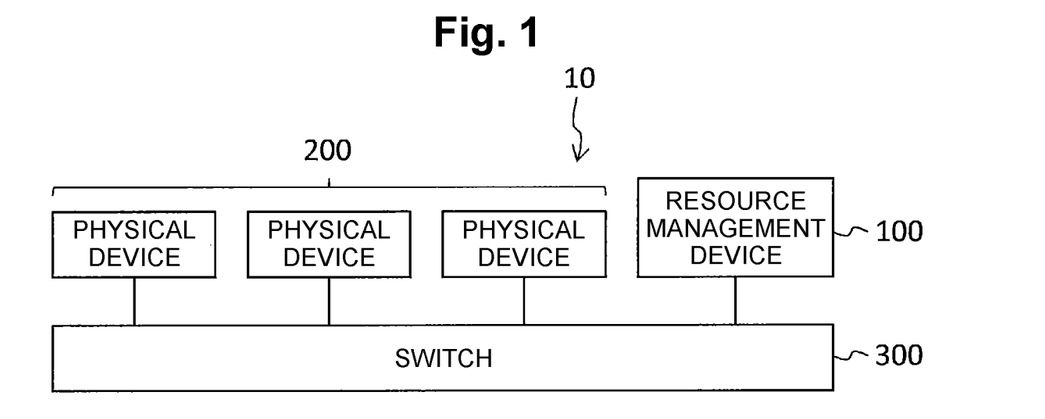
FIG. 1 is an entire configuration diagram of a virtualization infrastructure including a resource management device according to an embodiment.

FIG. 1 is an entire configuration diagram of a virtualization infrastructure 10 including a resource management device 100 according to the present embodiment. The virtualization infrastructure 10 includes physical devices 200, the resource management device 100, and a switch 300 connecting the physical devices 200 and the resource management device 100. Although three physical devices 200 are depicted in FIG. 1, the number of physical devices is not limited to three. Although the switch 300 is connected to a terminal used by a user who requests a virtualized resource, and to an external network to which a destination terminal is connected to which a service using a virtualized resource is provided, the terminal and the external network are not depicted in FIG. 1.

Each physical device 200 is, for example, a device including a physical resource, such as a physical host or a network device. The physical resource of the physical device 200 is virtualized, reserved as a virtualized resource, and used for a service. Examples of the physical resource include a CPU, a memory, a storage, a network (network bandwidth), and the like.

Configuration of Resource Management Device

Figure 2:
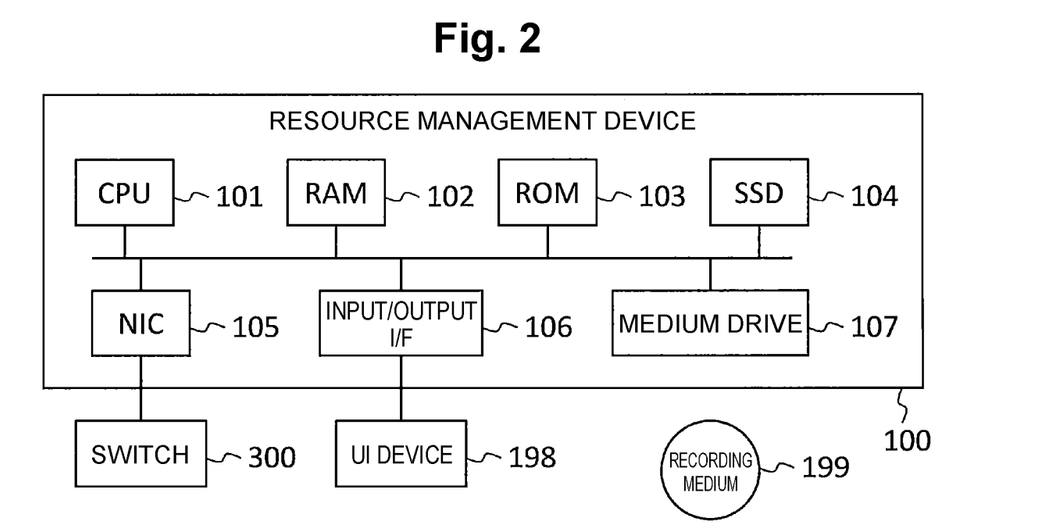
FIG. 2 is a hardware configuration diagram of the resource management device according to the present embodiment.

FIG. 2 is a hardware configuration diagram of the resource management device 100 according to the present embodiment. The resource management device 100 is a computer and includes a CPU 101, a RAM (Random Access Memory) 102, a ROM (Read Only Memory) 103, an SSD (Solid State Drive) 104, a NIC (Network Interface Card) 105, an input/output interface 106 (referred to as input/output I/F (interface) in FIG. 2), and a medium drive 107.

The NIC 105 is connected to the switch 300, and transmits and receives communication data to/from the physical device 200 and the terminal used by the user of the virtualization infrastructure 10. A UI (User Interface) device 198, such as a display, a keyboard, or a mouse, is connected to the input/output interface 106. The medium drive 107 reads a program on a recording medium 199. The CPU 101 executes the read program (see a program 121 in FIG. 3, which will be described later), whereby the resource management device 100, which is a computer, allocates and reserves a virtualized resource on any one of the physical devices 200 for a reservation request for the virtualized resource.

Figure 3:
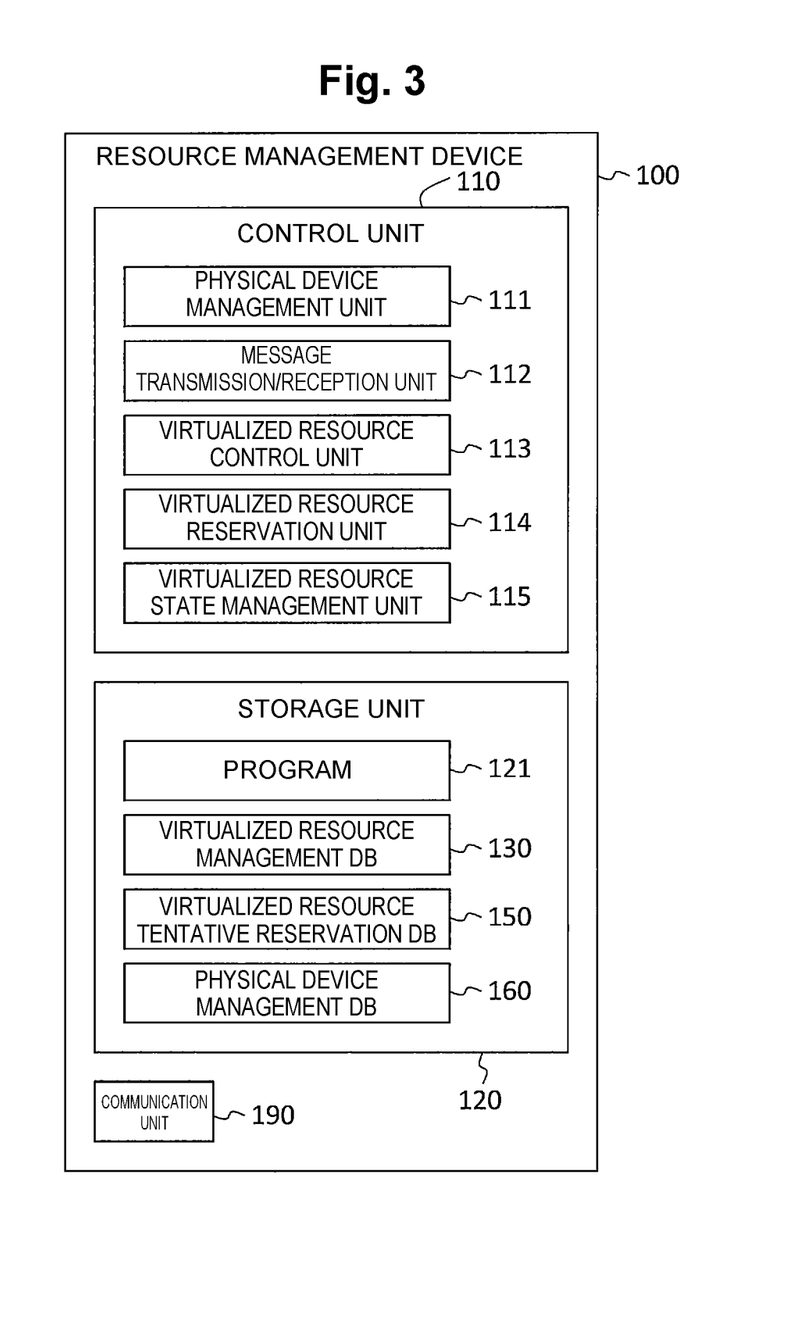
FIG. 3 is a functional configuration diagram of the resource management device according to the present embodiment.

FIG. 3 is a functional configuration diagram of the resource management device 100 according to the present embodiment. The resource management device 100 includes a control unit 110, a storage unit 120, and a communication unit 190. The communication unit 190 includes the NIC 105 (see FIG. 2), and transmits and receives communication data to/from the physical devices 200 and the terminal used by the user of the virtualization infrastructure 10.

Figure 4:
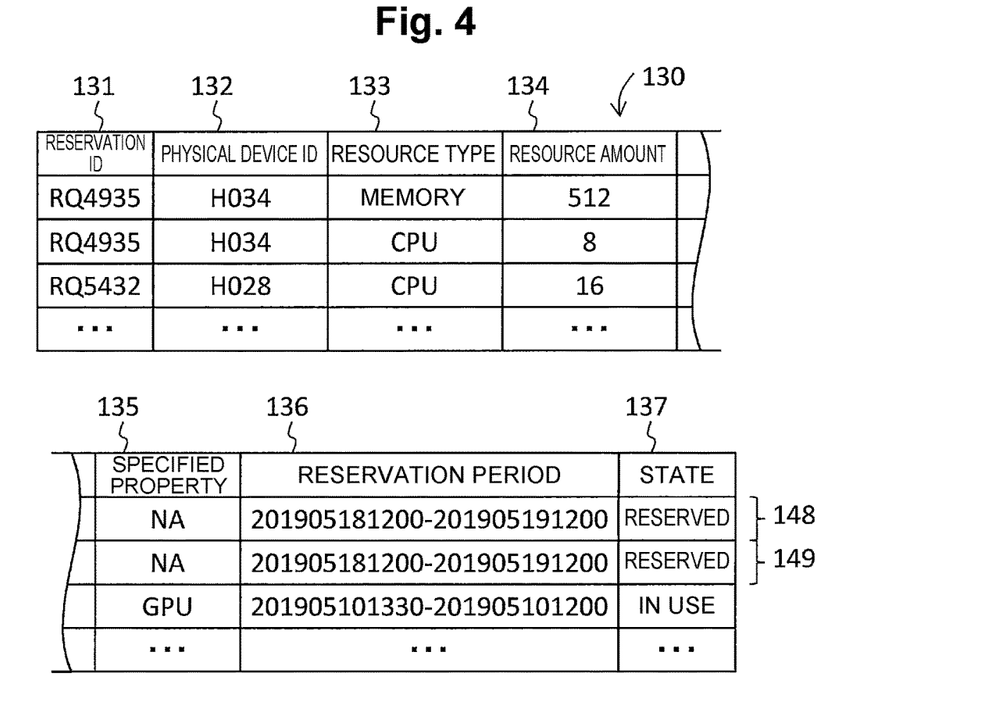
FIG. 4 is a data configuration diagram of a virtualized resource management database according to the present embodiment.

The storage unit 120 includes the RAM 102, the ROM 103, and the SSD 104, and stores the program 121, a virtualized resource management database 130 (referred to as virtualized resource management DB (database) in FIG. 3; see FIG. 4, which will be described later), a virtualized resource tentative reservation database 150 (see FIG. 5, which will be described later), a physical device management database 160, and the like. The physical device management database 160 includes information, such as a type, an amount, an auxiliary device, and availability/unavailability, on a virtualized resource included in each physical device 200.

Configuration of Resource Management Device:
Virtualized Resource Management Database FIG. 4 is a data configuration diagram of the virtualized resource management database 130 according to the present embodiment. The virtualized resource management database 130 is, for example, data in a tabular form and is a master database indicating reservation information on virtualized resources. One row (record) of the virtualized resource management database 130 indicates reservation information on one virtualized resource, and includes columns (attributes) of reservation identification information 131 (referred to as reservation ID (identifier) in FIG. 4), physical device identification information 132 (referred to as physical device ID in FIG. 4), resource type 133, resource amount 134, specified property 135, reservation period 136, and state 137.

The reservation identification information 131 is identification information on a reservation of a virtualized resource indicated by a record. The physical device identification information 132 is identification information on a physical device 200 in which the virtualized resource exists. The resource type 133 is a type of the virtualized resource, and examples of the type include CPU, memory, and the like. The resource amount 134 is an amount of the virtualized resource.

The specified property 135 is a property specified when the virtualized resource is reserved, and indicates, for example, an auxiliary device mounted in a physical host. The reservation period 136 is a time period for which the virtualized resource is reserved. The state 137 is a state of the virtualized resource and is "reserved" or "in use". "Reserved" indicates that the virtualized resource is already reserved but is not in use at a current point of time. "In use" indicates that the virtualized resource is reserved and use of the virtualized resource is already started.

A record 148 indicates a reservation with identification information of "RQ4935", a reservation of a 512-GB memory existing in a physical device with identification information of "H034", and a reservation for a reservation period between 1200 hours on May 18, 2019 and 1200 hours on the next day, May 19, 2019. A record 149 indicates that the same reservation reserves eight CPUs in the same physical device.

Figure 5:
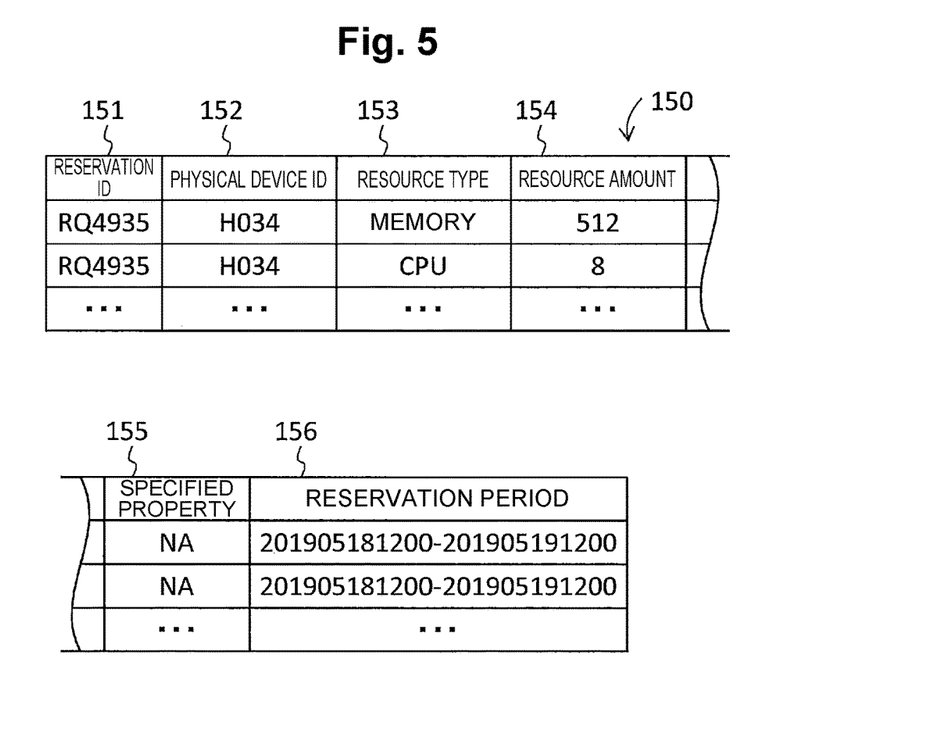
FIG. 5 is a data configuration diagram of a virtualized resource tentative reservation database according to the present embodiment.

Configuration of Resource Management Device:
Virtualized Resource Tentative Reservation Database FIG. 5 is a data configuration diagram of the virtualized resource tentative reservation database 150 according to the present embodiment. The virtualized resource tentative reservation database 150 is, for example, data in a tabular form and is a temporary database referred to by a virtualized resource state management unit 115, which will be described later, when a virtualized resource is reallocated for an existing reservation that is already allocated a virtualized resource in the virtualized resource management database 130 (see FIG. 4).

One row (record) of the virtualized resource tentative reservation database 150 indicates tentative reservation information on one virtualized resource, and includes reservation identification information 151 (referred to as reservation ID in FIG. 5), physical device identification information 152 (referred to as physical device ID in FIG. 5), a resource type 153, a resource amount 154, a specified property 155, and a reservation period 156. The reservation identification information 151, the physical device identification information 152, the resource type 153, the resource amount 154, the specified property 155, and the reservation period 156 are similar to the reservation identification information 131, the physical device identification information 132, the resource type 133, the resource amount 134, the specified property 135, and the reservation period 136 in the virtualized resource management database 130 (see FIG. 4), respectively.

Configuration of Resource Management Device:
Control Unit

Referring back to FIG. 3, the control unit 110 will be described.

A physical device management unit 111 performs control of start and stop of each physical device 200. A message transmission/reception unit 112 performs message exchange with each physical device 200, and reception of/response to a reservation request for a virtualized resource. A virtualized resource control unit 113 performs control of start, stop, migration, and the like of a service (a virtual machine or a virtualized network function) using a virtualized resource.

A virtualized resource reservation unit 114 performs processing for a reservation request for a virtualized resource received by the message transmission/reception unit 112. Specifically, the virtualized resource reservation unit 114 attempts a reservation by referring to the virtualized resource management database 130, searching for a physical device 200 having an available virtualized resource equivalent to the virtualized resource included in the reservation request, and allocating the virtualized resource. When the allocation succeeds, the virtualized resource reservation unit 114 stores a record of the reservation corresponding to the reservation request in the virtualized resource management database 130, and instructs the message transmission/reception unit 112 to send a response indicating success of the reservation to a request source. When the allocation fails, the virtualized resource reservation unit 114 outputs the reservation request to the virtualized resource state management unit 115.

When the virtualized resource state management unit 115 receives the reservation request from the virtualized resource reservation unit 114, the virtualized resource state management unit 115 attempts to allocate a virtualized resource for the reservation request (virtualized resource reallocation processing; see steps S13 to S22 in FIG. 6, which will be described later). Note that while the virtualized resource state management unit 115 is performing the virtualized resource reallocation processing, the virtualized resource reservation unit 114 performs processing for a new reservation request in parallel.

Virtualized Resource Allocation Processing

Figure 6:
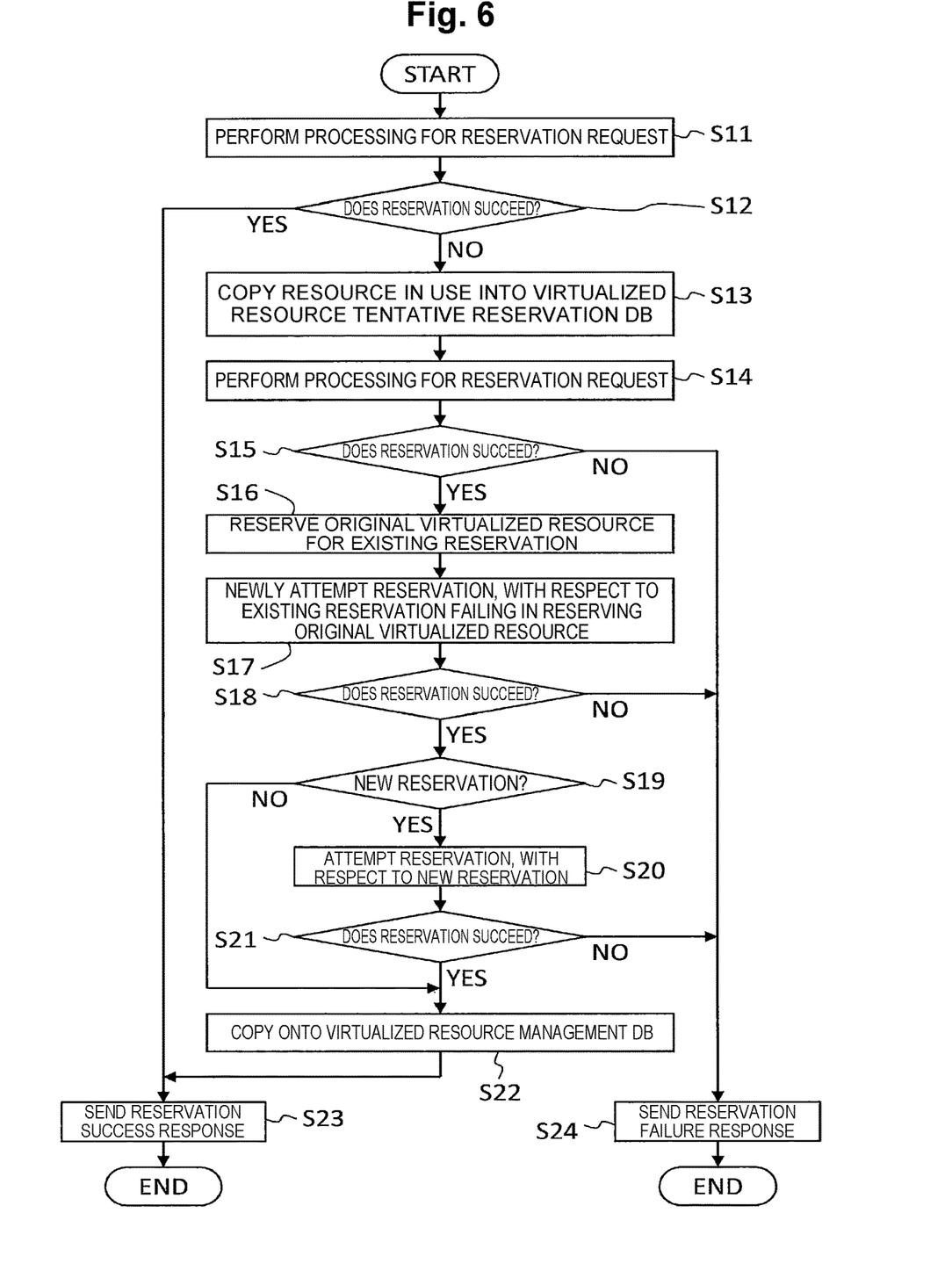
FIG. 6 is a flowchart of virtualized resource allocation processing performed by the resource management device, according to the present embodiment.

FIG. 6 is a flowchart of virtualized resource allocation processing performed by the resource management device 100, according to the present embodiment. The processing after the message transmission/reception unit 112 receives a reservation request will be described with reference to FIG. 6.

In step S11, the virtualized resource reservation unit 114 performs processing for the reservation request. Specifically, the virtualized resource reservation unit 114 attempts a reservation by referring to the virtualized resource management database 130, searching for a physical device 200 having an available virtualized resource equivalent to a virtualized resource included in the reservation request, and allocating the virtualized resource.

In step S12, when the allocation succeeds, so that the reservation succeeds (step S12→YES), the virtualized resource reservation unit 114 stores the reservation in the virtualized resource management database 130 and advances to step S23. When the allocation fails, so that the reservation fails (step S12→NO), the virtualized resource reservation unit 114 outputs the reservation request to the virtualized resource state management unit 115, and the virtualized resource state management unit 115 performs processing in and after step S13. After step S12 is finished, the virtualized resource reservation unit 114 performs processing for a new reservation request (see step S11).

In step S13, the virtualized resource state management unit 115 copies a record with the state 137 (see FIG. 4) indicating "in use" from the virtualized resource management database 130 into the virtualized resource tentative reservation database 150. Specifically, the virtualized resource state management unit 115 empties the virtualized resource tentative reservation database 150. Subsequently, the virtualized resource state management unit 115 adds a record, corresponding to each record with the state 137 indicating "in use" in the virtualized resource management database 130, to the virtualized resource tentative reservation database 150 and stores the reservation identification information 131, the physical device identification information 132, the resource type 133, the resource amount 134, the specified property 135, and the reservation period 136 as the reservation identification information 151, the physical device identification information 152, the resource type 153, the resource amount 154, the specified property 155, and the reservation period 156 of each added record, respectively.

The virtualized resource tentative reservation database 150 is to indicate reservation information on a reservation with the state 137 indicating "reserved" (an existing reservation) that is released in the virtualized resource management database 130. On the other hand, in the virtualized resource management database 130, each such existing reservation remains "reserved". Accordingly, it will also be stated that an existing reservation is tentatively released. Note that a reservation with the state 137 indicating "in use" is not included among the existing reservations. In subsequent steps, the virtualized resource state management unit 115 attempts a reservation by allocating resources for the reservation request for which the virtualized resource reservation unit 114 fails in arranging a reservation, and for each existing reservation, by referring to the virtualized resource tentative reservation database 150 in which only the reservations with the state 137 indicating "in use" are registered.

In step S14, the virtualized resource state management unit 115 attempts a reservation by referring to the virtualized resource tentative reservation database 150, searching for a physical device 200 having an available virtualized resource equivalent to the virtualized resource included in the reservation request outputted by the virtualized resource reservation unit 114 in step S12, and allocating the virtualized resource.

In step S15, the virtualized resource state management unit 115 stores the reservation of the virtualized resource in the virtualized resource tentative reservation database 150 and advances to step S16 when the reservation in step S14 succeeds (step S15→YES), and advances to step S24 when the reservation in step S14 fails (step S15→NO).

In step S16, the virtualized resource state management unit 115 performs reservation by allocating each existing reservation to an originally allocated virtualized resource. An existing reservation is a reservation with the state 137 (see FIG. 4) indicating "reserved" that is not copied into the virtualized resource tentative reservation database 150 in step S13. Specifically, with respect to each existing reservation, the virtualized resource state management unit 115 attempts to allocate the existing reservation a virtualized resource that exists in a physical device indicated under the physical device identification information 132 and corresponds to the resource type 133 and the resource amount 134 in the virtualized resource management database 130. The reservation performed for the existing reservation succeeds when the virtualized resource is not allocated for the reservation request in step S14, but the reservation performed for the existing reservation fails when the virtualized resource is allocated for the reservation request. The virtualized resource state management unit 115 stores each successful reservation in the virtualized resource tentative reservation database 150.

In step S17, with respect to each existing reservation for which the reservation performed in step S16 fails, the virtualized resource state management unit 115 newly attempts a reservation in order one by one. In step S16, the virtualized resource state management unit 115 attempts at and fails in allocating the virtualized resource in the same physical device that is indicated in the virtualized resource management database 130. In step S17, the virtualized resource state management unit 115 attempts to newly allocate a virtualized resource that exists in a different physical device and corresponds to the resource type 133 and the resource amount 134. The virtualized resource state management unit 115 stores each successful reservation in the virtualized resource tentative reservation database 150.

In step S18, the virtualized resource state management unit 115 advances to step S19 when all of the reservations newly attempted for the failed existing reservations succeed in the step S17 (step S18→YES), and advances to step S24 when even one or some of the newly attempted reservations fail (step S18→NO).

In step S19, the virtualized resource state management unit 115 advances to step S20 when there is any reservation (hereinafter, referred to as new reservation) that is successfully arranged for a new reservation request received after step S12 by the virtualized resource reservation unit 114 (step S19→YES), and advances to step S22 when there is no new reservation (step S19→NO).

In step S20, with respect to each new reservation, the virtualized resource state management unit 115 newly attempts a reservation in order one by one. The virtualized resource state management unit 115 stores each successful reservation in the virtualized resource tentative reservation database 150.

In step S21, the virtualized resource state management unit 115 advances to step S22 when all of the reservations newly attempted for the new reservations succeed in step S20 (step S21→YES), and advances to step S24 when even one or some of the newly attempted reservations fail (step S21→NO).

In step S22, the virtualized resource state management unit 115 copies the virtualized resource tentative reservation database 150 onto the virtualized resource management database 130 (overwrites the virtualized resource management database 130 with the virtualized resource tentative reservation database 150). Specifically, the virtualized resource state management unit 115 adds a record, in the virtualized resource tentative reservation database 150, of the reservation corresponding to the reservation request failing in steps S11 to S12, to the virtualized resource management database 130. The virtualized resource state management unit 115 replaces records of each existing reservation and each new reservation in the virtualized resource management database 130, with corresponding records in the virtualized resource tentative reservation database 150.

In step S22, reservations are successfully arranged for all of the reservation request failing in steps S11 to S12, the existing reservations, and the new reservations, and reservation information on the reservations is stored in the virtualized resource tentative reservation database 150. The virtualized resource state management unit 115 updates the reservation information in the virtualized resource management database 130 by overwriting the virtualized resource management database 130 indicating the reservation information on originally allocated virtualized resources, with the reservation information in the virtualized resource tentative reservation database 150. When the reservation fails and "NO" is chosen in step S15, S18, or S21, the information in the virtualized resource tentative reservation database 150 is discarded.

In step S23, the message transmission/reception unit 112 sends a response indicating success of the reservation request, to the request source.

In step S24, the message transmission/reception unit 112 sends a response indicating failure of the reservation request, to the request source.

Characteristics of Virtualized Resource Allocation Processing

When the virtualized resource reservation unit 114 fails in processing for a reservation request, the virtualized resource state management unit 115 attempts to arrange reservations by allocating a virtualized resource for the reservation request and thereafter allocating a virtualized resource for each existing reservation, while referring to the virtualized resource tentative reservation database 150 in which only a virtualized resource in use is reserved. In some cases, success of the reservations enables the resource management device 100 to allocate a virtualized resource also for a reservation request that conventionally fails in reservation, and accordingly resources of the virtualization infrastructure 10 can be efficiently used.

When re-reservation is performed for an existing reservation (steps S16 to S17), the virtualized resource state management unit 115 allocates the same already allocated physical device 200 when the physical device 200 has an available virtualized resource (see step S16). When the same physical device 200 cannot be allocated, the virtualized resource state management unit 115 allocates another physical device 200 (see step S17). Re-reservation is newly performed for not all existing reservations, but an existing reservation is allocated, if possible, to a physical device 200 already allocated for the existing reservation, whereby the virtualized resource reallocation processing can be sped up.

The virtualized resource state management unit 115 performs the reallocation processing (steps S13 to S22) by referring to the virtualized resource tentative reservation database 150 that is different from the master virtualized resource management database 130. Specifically, the virtualized resource state management unit 115 newly allocates and reserves a virtualized resource for an existing reservation, assuming that the existing reservation is in a reservation-released state (a state where the virtualized resource is released, a state where the reservation is tentatively released) although the existing reservation remains in a reserved state (with the state 137 indicating "reserved") on the virtualized resource management database 130. Accordingly, the virtualized resource reservation unit 114 can continue to perform processing for a reservation request by referring to the virtualized resource management database 130 (see steps S11 to S12) in parallel while the virtualized resource state management unit 115 is performing the reallocation processing. Accordingly, processing for a reservation request in the resource management device 100 can be sped up.

Modification Example: Order in Re-Reservation

In step S17 (see FIG. 6), with respect to each existing reservation failing in reservation, the virtualized resource state management unit 115 newly attempts a reservation in order one by one. The virtualized resource state management unit 115 may newly attempt a reservation while varying the order. For example, it is assumed that existing reservations failing in reservation are a reservation 1, a reservation 2, a reservation 3, a reservation 4, and a reservation 5. When newly attempted reservations fail that are attempted in the following order of the reservation 1, the reservation 2, the reservation 3, the reservation 4, and the reservation 5, the virtualized resource state management unit 115 next newly attempts reservations in the following order of the reservation 2, the reservation 3, reservation 4, the reservation 5, and the reservation 1. When the newly attempted reservations also fail in such order, reservations are newly attempted in the following order of the reservation 3, the reservation 4, the reservation 5, reservation 1, and the reservation 2. In such a manner, the virtualized resource state management unit 115 may newly attempt reservations while changing the order of the reservations in turn. In such a case, when the number of failed existing reservations is N, reservations are attempted in N orders at the maximum.

As another method, reservations may be attempted in every possible order. In such a case, reservations are reattempted in N! (factorial N) orders at the maximum. As another method, reservations may be attempted in order from an existing reservation requesting a largest resource amount. A processing time period can be reduced by allocating virtualized resources in order from an existing reservation for which it is most difficult to allocate a resource.

Modification Example: Reservation Newly Attempted for Existing Reservation

In steps S16 to S17 (see FIG. 6) in the above-described embodiment, an existing reservation is allocated to the same physical device that is indicated under the physical device identification information 132 in the virtualized resource management database 130, and for an existing reservation failing in the allocation, a physical device 200 is searched for and a virtualized resource is newly allocated. As another example, for every existing reservation, a physical device 200 may be searched for and a virtualized resource may be newly allocated.

In the above-described embodiment, while the virtualized resource state management unit 115 is performing the virtualized resource reallocation processing (steps S13 to S22 in FIG. 6), the virtualized resource reservation unit 114 performs processing for a new reservation request in parallel. As another example, the virtualized resource reservation unit 114 may be configured not to perform processing for a new reservation request while the virtualized resource state management unit 115 is performing the virtualized resource reallocation processing.

Figure 7:
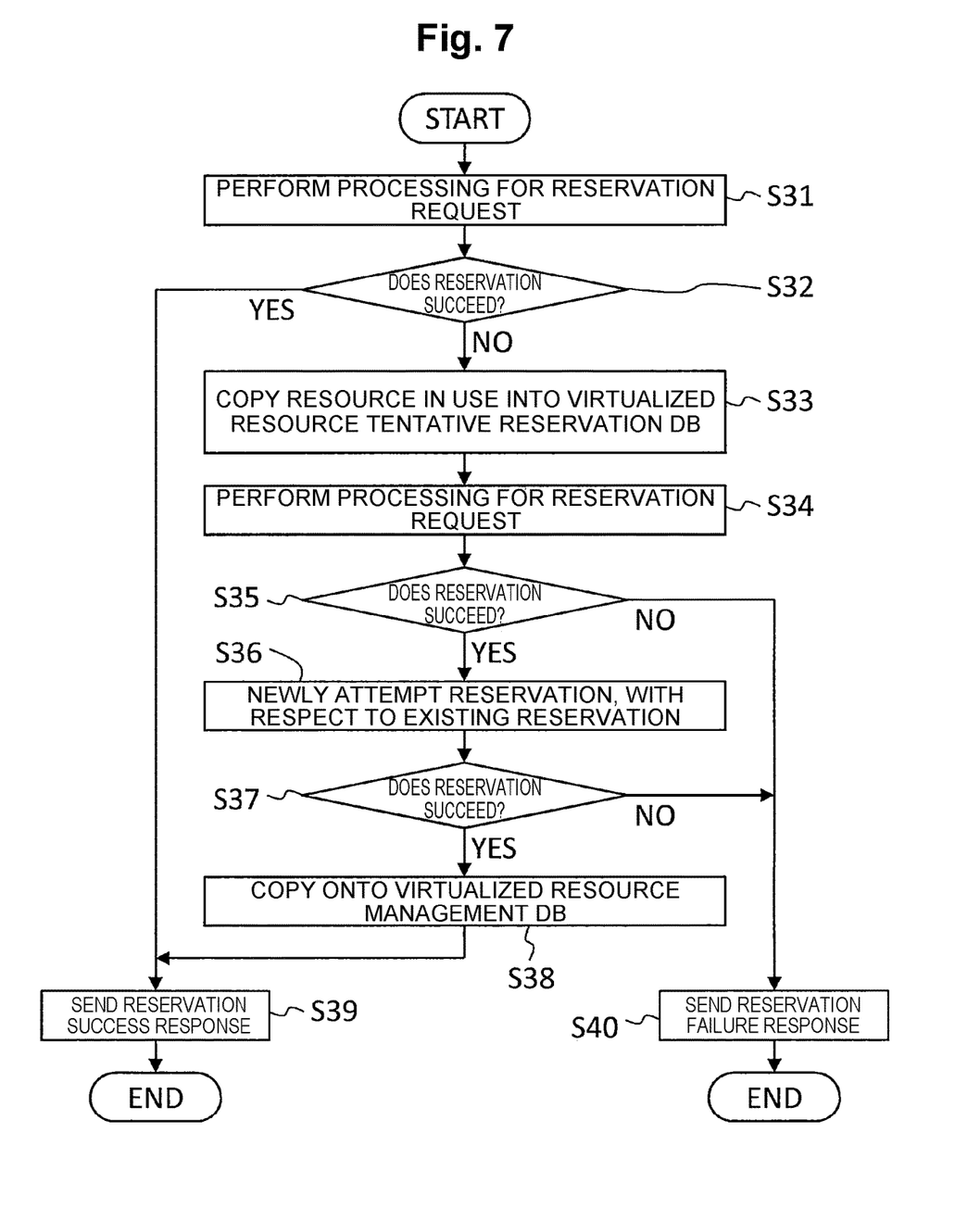
FIG. 7 is a flowchart of virtualized resource allocation processing performed by the resource management device, according to a modification example of the present embodiment.

FIG. 7 is a flowchart of virtualized resource allocation processing performed by the resource management device 100, according to a modification of the present embodiment. Steps S31, S33 to S35, S37 to S40 correspond to steps S11, S13 to S15, S18, S22 to S24 in FIG. 6, respectively. Hereinafter, differences from FIG. 6 will be described.

In FIG. 6, after step S12 is finished, the virtualized resource reservation unit 114 performs processing for a new reservation request. As another example, in FIG. 7, the virtualized resource reservation unit 114 does not perform processing for a new reservation request after step S32 is finished, but performs processing for a new reservation request after the virtualized resource allocation processing shown in FIG. 7 is finished.

Steps S16 and S17 in FIG. 6 are replaced with step S36 in FIG. 7, in which the virtualized resource state management unit 115 attempts to search for a physical device 200 and newly allocate a virtualized resource for every existing reservation.

Steps S19 to S21 in FIG. 6 are not included in the virtualized resource allocation processing shown in FIG. 7. The reason is that the virtualized resource reservation unit 114 does not perform processing for a new reservation request, and therefore no new reservation occurs.

In step S36, since the virtualized resource state management unit 115 attempts to search for a physical device 200 and newly allocate a virtualized resource for every existing reservation, a probability is increased that resource allocation for all existing reservations succeed, although the processing time period is sacrificed. Moreover, since the virtualized resource reservation unit 114 does not perform processing for a reservation request and therefore no new reservation occurs while the virtualized resource state management unit 115 is performing the virtualized resource reallocation processing, a probability is increased that the virtualized resource reallocation processing succeeds.

Other Modification Examples

The present invention is not limited to the above-described embodiment, and changes may be made, in addition to the above-described modification examples, within a scope that does not depart from the gist of the present invention. For example, the program for the resource management device 100 is read from the recording medium 199, but may be acquired via a network. As another embodiment, the program for the resource management device 100 may be acquired from a server that distributes the program for the resource management device 100.

In the above-described present embodiment, the virtualized resource state management unit 115 accesses the virtualized resource tentative reservation database 150 in the virtualized resource reallocation processing. In place of the virtualized resource tentative reservation database 150, the virtualized resource management database 130 may be accessed. Specifically, as a value of the state 137 (see FIG. 4), "tentatively reserved" is provided in addition to "reserved" and "in use". When performing reservation in the virtualized resource reallocation processing, the virtualized resource state management unit 115 allocates a virtualized resource, assuming that there are no reservations with the state 137 indicating "reserved". When the allocation succeeds, the virtualized resource state management unit 115 stores a reservation not in the virtualized resource tentative reservation database 150, but in the virtualized resource management database 130 as a record with the state 137 indicating "tentatively reserved". When the allocation fails, the virtualized resource state management unit 115 deletes a record indicating "tentatively reserved".

Although some embodiments of the present invention have been described hereinabove, the embodiments are described only for illustrative purposes, and do not limit the technical scope of the present invention. The present invention can be implemented in other various embodiments, and further, various changes such as omission and substitution can be made within a scope that does not depart from the gist of the present invention. Such embodiments and modifications are incorporated within the scope and the gist of the invention described in the present description and the like, and within the scope of the inventions and equivalence thereof according to claims.

Effects

Hereinafter, effects of the resource management device will be described.

The resource management device 100 according to the present embodiment includes: the storage unit 120 including the virtualized resource management database 130 that stores reservation information on a virtualized resource by storing the virtualized resource and a reservation period of the virtualized resource in association with each other; the virtualized resource reservation unit 114 that receives a reservation request for the virtualized resource, and allocates and reserves the virtualized resource included in the reservation request; and the virtualized resource state management unit 115 as described below. When reservation performed for the reservation request fails, the virtualized resource state management unit 115 performs tentative release of a reservation with respect to one or more existing reservations each representing a reservation of a virtualized resource already reserved, and allocates and reserves the virtualized resource included in the reservation request. Further, the virtualized resource state management unit 115 performs re-reservation for each of the one or more existing reservations by allocating an applicable virtualized resource. When the re-reservation succeeds for all of the one or more existing reservations, the virtualized resource state management unit 115 concludes that the reservation request succeeds. When the re-reservation fails even for one or some of the one or more existing reservations, the virtualized resource state management unit 115 releases a reservation arranged for the reservation request and keeps reservation information on the one or more existing reservations stored before the tentative release is performed.

According to the resource management device 100 as described above, for a reservation request for which the virtualized resource reservation unit 114 fails in arranging a reservation, the virtualized resource state management unit 115 may succeed in allocating and reserving a virtualized resource in some cases, and accordingly, resources of the virtualization infrastructure 10 can be efficiently used.

In the resource management device 100 according to the present embodiment, in the re-reservation performed by the virtualized resource state management unit 115 for the one or more existing reservations, the virtualized resource allocated before the tentative release is performed is allocated and reserved for each of the one or more existing reservations, and for an existing reservation for which allocation fails, a virtualized resource that is different from the virtualized resource allocated before the tentative release is performed and that is equivalent to the reservation information stored before the tentative release is performed is allocated and reserved.

Thus, the virtualized resource state management unit 115 does not newly perform the re-reservation for every existing reservation, but allocates an existing reservation, if possible, to a physical device already allocated for the existing reservation, and accordingly, processing for the re-reservation can be sped up.

In the resource management device 100 according to the present embodiment, the virtualized resource reservation unit 114 receives one or more new reservation requests while the virtualized resource state management unit 115 is performing processing. The virtualized resource reservation unit 114 allocates and reserves a virtualized resource included in each of the one or more new reservation requests, in addition to the reservation information stored when the reservation performed for the reservation request fails. The virtualized resource state management unit 115, after the re-reservation succeeds for all of the one or more existing reservations, performs another reservation for the one or more new reservation requests for each of which a reservation is successfully arranged by the virtualized resource reservation unit 114, by allocating a virtualized resource applicable to each of the one or more new reservation requests. When the other reservation succeeds for all of the one or more new reservation requests, the virtualized resource state management unit 115 concludes that the reservation request succeeds. When the other reservation fails even for one or some of the one or more new reservation requests, the virtualized resource state management unit 115 keeps the reservation information stored when the virtualized resource included in each of the one or more new reservation requests is allocated and reserved, in addition to the reservation information stored when the reservation performed for the reservation request fails.

Thus, the virtualized resource reservation unit 114 continues to perform processing for a new reservation request in parallel while the virtualized resource state management unit 115 is performing re-reservation processing. Accordingly, the processing for a reservation request in the resource management device can be sped up.

REFERENCE SIGNS LIST

10 Virtualization infrastructure
100 Resource management device
114 Virtualized resource reservation unit
115 Virtualized resource state management unit
130 Virtualized resource management database
150 Virtualized resource tentative reservation database
199 Recording medium

The invention claimed is:

1. A resource management device comprising:
a storage unit including one or more processors and a virtualized resource management database that is configured to store reservation information regarding a virtualized resource by storing the virtualized resource and a reservation period of the virtualized resource in association with each other;
a virtualized resource reservation unit that includes one or more processors and that is configured to receive reservation request for the virtualized resource, and allocate and reserve the virtualized resource included in the reservation request; and
a virtualized resource state management unit that includes one or more processors and that is configured to:
based on a reservation performed for the reservation request failing, perform tentative release of a reservation with respect to one or more existing reservations each representing a reservation of a virtualized resource already reserved, among a plurality of existing reservations including (i) the one or more existing reservations each representing a reservation of a virtualized resource already reserved and (ii) one or more existing reservations each representing a reservation of a virtualized resource in use,
allocate and reserve the virtualized resource included in the reservation request,
perform re-reservation for each of the one or more existing reservations representing a reservation of a virtualized resource already reserved among the plurality of existing reservations by allocating an applicable virtualized resource,
based on the re-reservation succeeding for all of the one or more existing reservations, determine that the reservation request succeeds, and
based on the re-reservation failing some of the one or more existing reservations, release a reservation arranged for the reservation request and maintain reservation information regarding the one or more existing reservations stored before the tentative release is performed.

2. The resource management device according to claim 1, wherein in the re-reservation performed by the virtualized resource state management unit for the one or more existing reservations, the virtualized resource allocated before the tentative release is performed is allocated and reserved for each of the one or more existing reservations, and for an existing reservation for which allocation fails, a virtualized resource that is different from the virtualized resource allocated before the tentative release is performed and that is equivalent to the reservation information stored before the tentative release is performed is allocated and reserved.

3. The resource management device according to claim 1, wherein:
the virtualized resource reservation unit receives one or more new reservation requests while the virtualized resource state management unit is performing processing, and allocates and reserves a virtualized resource included in each of the one or more new reservation requests, in addition to the reservation information stored based on the reservation performed for the reservation request failing, and
the virtualized resource state management unit, after the re-reservation succeeds for all of the one or more existing reservations, performs another reservation for the one or more new reservation requests for each of which a reservation is successfully arranged by the virtualized resource reservation unit, by allocating a virtualized resource applicable to each of the one or more new reservation requests, and, based on the other reservation succeeding for all of the one or more new reservation requests, determines that the reservation request succeeds, and, based on the other reservation failing some of the one or more new reservation requests, maintains the reservation information stored when the virtualized resource included in each of the one or more new reservation requests is allocated and reserved, in addition to the reservation information stored when the reservation performed for the reservation request fails.

4. The resource management device according to claim 1, wherein performing re-reservation for each of the one or more existing reservations comprises attempting the reservations in a varying sequence, such that an order of the reservations is changed for each subsequent attempt.

5. The resource management device according to claim 4, wherein a maximum number of attempts of the reservations is equal to a number of reservations that have failed.

6. The resource management device according to claim 1, wherein performing re-reservation for each of the one or more existing reservations comprises attempting the reservations in every possible order, with a maximum number of attempts being equal to a factorial of a number of failed reservations.

7. The resource management device according to claim 1, wherein performing re-reservation for each of the one or more existing reservations comprises attempting reservations in an order from an existing reservation requesting a largest resource amount.

8. A resource management method performed by a resource management device, wherein the resource management device includes a storage unit including a virtualized resource management database that stores reservation information regarding a virtualized resource by storing the virtualized resource and a reservation period of the virtualized resource in association with each other, the resource management method comprising:
receiving reservation request for the virtualized resource, and allocating and reserving the virtualized resource included in the reservation request; and
based on reservation performed for the reservation request failing, performing tentative release of a reservation with respect to one or more existing reservations each representing a reservation of a virtualized resource already reserved, among a plurality of existing reservations including (i) the one or more existing reservations each representing a reservation of a virtualized resource already reserved and (ii) one or more existing reservations each representing a reservation of a virtualized resource in use, allocating and reserving the virtualized resource included in the reservation request, performing re-reservation for each of the one or more existing reservations representing a reservation of a virtualized resource already reserved among the plurality of existing reservations by allocating an applicable virtualized resource, and, based on the re-reservation succeeding for all of the one or more existing reservations, determining that the reservation request succeeds, and, based on the re-reservation failing some of the one or more existing reservations, releasing a reservation arranged for the reservation request and maintaining reservation information regarding the one or more existing reservations stored before the tentative release is performed.

9. The resource management method according to claim 8, wherein performing re-reservation for each of the one or more existing reservations comprises attempting the reservations in a varying sequence, such that an order of the reservations is changed for each subsequent attempt.

10. The resource management method according to claim 9, wherein a maximum number of attempts of the reservations is equal to a number of reservations that have failed.

11. The resource management method according to claim 8, wherein performing re-reservation for each of the one or more existing reservations comprises attempting the reservations in every possible order, with a maximum number of attempts being equal to a factorial of a number of failed reservations.

12. The resource management method according to claim 8, wherein performing re-reservation for each of the one or more existing reservations comprises attempting reservations in an order from an existing reservation requesting a largest resource amount.

13. A non-transitory recording medium storing a program for causing a computer that includes a storage unit including a virtualized resource management database that stores reservation information regarding a virtualized resource by storing the virtualized resource and a reservation period of the virtualized resource in association with each other, to execute operations comprising:
receiving reservation request for the virtualized resource, and allocating and reserving the virtualized resource included in the reservation request; and
based on reservation performed for the reservation request failing, performing tentative release of a reservation with respect to one or more existing reservations each representing a reservation of a virtualized resource already reserved, among a plurality of existing reservations including (i) the one or more existing reservations each representing a reservation of a virtualized resource already reserved and (ii) one or more existing reservations each representing a reservation of a virtualized resource in use, allocating and reserving the virtualized resource included in the reservation request, performing re-reservation for each of the one or more existing reservations representing a reservation of a virtualized resource already reserved among the plurality of existing reservations by allocating an applicable virtualized resource, and, based on the re-reservation succeeding-for all of the one or more existing reservations, determining that the reservation request succeeds, and, based on the re-reservation failing some of the one or more existing reservations, releasing a reservation arranged for the reservation request and maintaining reservation information regarding the one or more existing reservations stored before the tentative release is performed.

14. The non-transitory recording medium according to claim 13, wherein in the re-reservation for the one or more existing reservations, the virtualized resource allocated before the tentative release is performed is allocated and reserved for each of the one or more existing reservations, and for an existing reservation for which allocation fails, a virtualized resource that is different from the virtualized resource allocated before the tentative release is performed and that is equivalent to the reservation information stored before the tentative release is performed is allocated and reserved.

15. The non-transitory recording medium according to claim 13, wherein the operations further comprise:
receiving one or more new reservation requests, and allocating and reserving a virtualized resource included in each of the one or more new reservation requests, in addition to the reservation information stored based on the reservation performed for the reservation request failing, and
after the re-reservation succeeds for all of the one or more existing reservations, performing another reservation for the one or more new reservation requests for each of which a reservation is successfully arranged, by allocating a virtualized resource applicable to each of the one or more new reservation requests, and, based on the other reservation succeeding for all of the one or more new reservation requests, determining that the reservation request succeeds, and, based on the other reservation failing for some of the one or more new reservation requests, maintaining the reservation information stored when the virtualized resource included in each of the one or more new reservation requests is allocated and reserved, in addition to the reservation information stored when the reservation performed for the reservation request fails.

16. The non-transitory recording medium according to claim 13, wherein performing re-reservation for each of the one or more existing reservations comprises attempting the reservations in a varying sequence, such that an order of the reservations is changed for each subsequent attempt.

17. The non-transitory recording medium according to claim 16, wherein a maximum number of attempts of the reservations is equal to a number of reservations that have failed.

18. The non-transitory recording medium according to claim 13, wherein performing re-reservation for each of the one or more existing reservations comprises attempting the reservations in every possible order, with a maximum number of attempts being equal to a factorial of a number of failed reservations.

19. The non-transitory recording medium according to claim 13, wherein performing re-reservation for each of the one or more existing reservations comprises attempting reservations in an order from an existing reservation requesting a largest resource amount.

* * * * *